US008386483B2

(12) United States Patent
Boyer et al.

(10) Patent No.: US 8,386,483 B2
(45) Date of Patent: Feb. 26, 2013

(54) PROVIDING INCREASED QUALITY OF CONTENT TO A USER OVER TIME

(75) Inventors: John Edward Boyer, Seattle, WA (US); Peter Alan Coldicott, Austin, TX (US); Edward Emile Kelley, Wappingers Falls, NY (US); Eoin Lane, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 12/604,204

(22) Filed: Oct. 22, 2009

(65) Prior Publication Data

US 2011/0099168 A1    Apr. 28, 2011

(51) Int. Cl.
*G06F 7/00* (2006.01)
(52) U.S. Cl. .......................... 707/733; 707/734
(58) Field of Classification Search .......... 707/732–734, 707/768, 777; 705/319
See application file for complete search history.

(56) References Cited

U.S. PATENT DOCUMENTS

| | | | |
|---|---|---|---|
| 6,085,186 A * | 7/2000 | Christianson et al. ................. | 1/1 |
| 6,327,590 B1 * | 12/2001 | Chidlovskii et al. .......... | 707/734 |
| 6,564,222 B1 * | 5/2003 | Sassano ......... | 707/736 |
| 7,240,055 B2 * | 7/2007 | Grasso et al. ........................ | 1/1 |
| 7,275,068 B2 | 9/2007 | Huberman et al. | |
| 7,340,442 B2 | 3/2008 | Jeanblanc et al. | |
| 7,499,965 B1 | 3/2009 | Chai | |
| 7,822,762 B2 * | 10/2010 | Payne et al. ................... | 707/765 |
| 2002/0049692 A1 | 4/2002 | Venkatram | |
| 2003/0154232 A1* | 8/2003 | Beringer et al. ............. | 709/102 |
| 2004/0044658 A1* | 3/2004 | Crabtree et al. ................. | 707/3 |
| 2006/0288095 A1* | 12/2006 | Torok et al. .................... | 709/223 |
| 2007/0255721 A1 | 11/2007 | Chess et al. | |
| 2008/0052246 A1 | 2/2008 | Dunagan et al. | |
| 2008/0243827 A1* | 10/2008 | Sarma et al. ....................... | 707/5 |
| 2008/0282198 A1 | 11/2008 | Brooks et al. | |
| 2009/0077094 A1 | 3/2009 | Bodain | |
| 2009/0193096 A1* | 7/2009 | Boyer et al. .................. | 709/217 |
| 2009/0210408 A1* | 8/2009 | Boyer et al. ....................... | 707/5 |

OTHER PUBLICATIONS

Diederich et al. "Finding Communities of Practice from User Profiles Based on Folksonomies" Innovative Approaches for Learning and Knowledge Sharing, EC-TEL 2006 Workshops Proceedings, 2006, pp. 288-297.*
Glance et al. "Knowledge Pump: Community-centered Collaborative Filtering" Proceedings of the Delos Workshop on Collaborative Filtering. 1997. 5 Pages.*
Pawar et al., "Towards Business Model and Technical Platform for the Service Oriented Context-Aware Mobile Virtual Communities", IEEE Symposium on Computers and Communications, Jul. 2008, pp. 103-110.

* cited by examiner

*Primary Examiner* — James E Richardson
(74) *Attorney, Agent, or Firm* — Yee & Associates, P.C.; Mark C. Vallone

(57) ABSTRACT

Increasing quality of content provided to a user is provided. Communities of practice a user is associated with are determined based on login data. A corresponding set of tags is retrieved for each of the communities of practice. All corresponding sets of tags are aggregated to define a role for the user. A personal set of tags associated with the user is retrieved. The personal set of tags is added to the aggregate of all corresponding sets of tags to create a new set of tags. A context of the user in the particular task is recorded. The new set of tags is filtered based on the context to create a sub-set of tags. A defined number of tag aware information sources are queried using the sub-set of tags. Content is received from the defined number of tag aware information sources based on the query. The content is outputted.

15 Claims, 5 Drawing Sheets

USER TABLE
300

| USER ID 302 | CONTEXT ID 304 | TAGS 306 | RESOURCE 1 (REFERENCE MATERIALS) 308 | RESOURCE 2 (DOMAIN EXPERTS) 310 | RESOURCE N 312 |
|---|---|---|---|---|---|
| 0001 UNIQUE USER ID | UNIQUE CONTEXT ID | TAG 1, TAG 2, TAG 3 | MPEP | JOHN LONG | . . . |
| 0009 UNIQUE USER ID | UNIQUE CONTEXT ID | TAG 1, TAG 2, TAG 3 | MPEP, ANOTHER DOCUMENT | MAY FLYNN | . . . |
| . . . | . . . | . . . | . . . | . . . | . . . |

PROVIDING INCREASED QUALITY OF CONTENT TO A USER OVER TIME

BACKGROUND

1. Field:

The disclosure relates generally to an improved data processing system and more specifically to a computer implemented method, apparatus, and computer usable program code for automatically increasing the quality of content provided to a user in a role within the context of performing a particular task over time.

2. Description of the Related Art

A Community of Practice (CoP) is a special type of informal network that emerges from a desire to work more effectively or to understand work more deeply among members of a particular specialty or work group. People in a CoP may perform the same job, such as technical representatives, collaborate on a shared task, such as software developers, or work together on a product, such as engineers. These people are colleagues, bound together by their common responsibility to get a certain type of "real work" done. Typically, many communities of practice exist within a single company, and most people belong to more than one CoP.

CoP refers to the process of social learning, which occurs when people who have common goals interact as they strive towards those goals. CoP has become associated with knowledge management as people have begun to see a CoP as a way of nurturing new knowledge, stimulating innovation, and sharing existing knowledge within an organization. The knowledge that is shared and learned in communities of practice is social capital. People connect at various levels and across departments, both internally and externally of a company or organization, without the constraints of a formal company structure. As people connect with each other, they are able to share their expertise and learn from other members. Benefits include problem solving, developing new capabilities, leveraging best practices, standardizing practices, saving time, increasing talent, avoiding mistakes, and creating new knowledge.

Studies show that workers spend a third of their time looking for information and are five times more likely to turn to a coworker rather than an explicit source of information, such as a book. Time is saved by conferring with members of a CoP. People have tacit knowledge, which is not found in a book. For example, one person may share the best way to handle a situation based on personal experience, which may enable other members in the CoP to avoid similar mistakes and shorten the learning curve. In a CoP, members can openly discuss and brainstorm about a project that may lead to new capabilities. The type of information that is shared and learned in a CoP is boundless. A CoP is usually formed within a single discipline in order to focus efforts in sharing knowledge, solving problems, or innovative ventures.

SUMMARY

According to one embodiment of the present invention, the quality of content provided to a user is automatically increased over time. Communities of practice a user is associated with are determined based on login data received from the user to start a particular task. A corresponding set of tags is retrieved for each of the communities of practice determined to be associated with the user based on the login data received. All corresponding sets of tags for the communities of practice determined to be associated with the user are aggregated to define a role for the user in the particular task. A personal set of tags associated with the user is also retrieved for the particular task. The personal set of tags associated with the user for the particular task is added to the aggregate of all corresponding sets of tags for the communities of practice determined to be associated with the user to create a new set of tags representing the user in the role in the particular task. A context of the user in the particular task is recorded in a data structure in a storage device. The new set of tags representing the user in the role in the particular task is filtered based on the context to create a sub-set of tags representing the user in the role in the context of performing the particular task. A defined number of tag aware information sources are queried using the sub-set of tags representing the user in the role in the context of performing the particular task. Content is received from the defined number of tag aware information sources based on the query using the sub-set of tags representing the user in the role in the context of performing the particular task. Then, the content received from the defined number of tag aware information sources is outputted on an output device for use by the user in the role in the context of performing the particular task.

BRIEF DESCRIPTION OF THE SEVERAL VIEWS OF THE DRAWINGS

FIG. 3 is an exemplary illustration of a table of user records in accordance with an illustrative embodiment; and FIG. 4A

DETAILED DESCRIPTION

Figure 1:
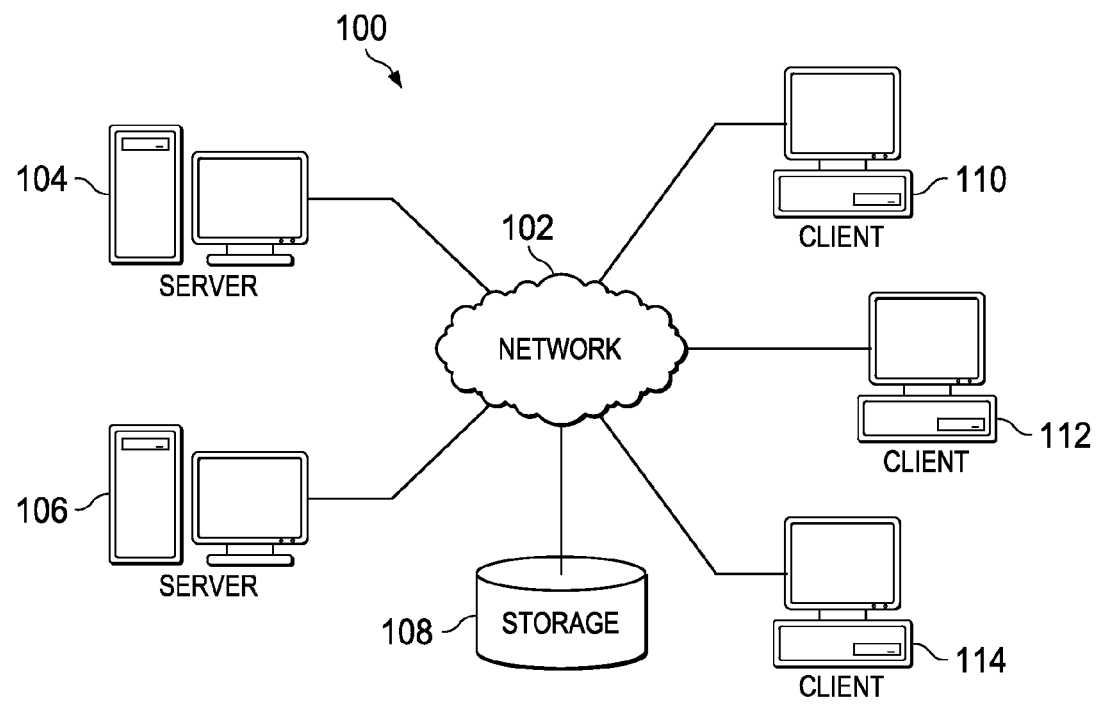
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable data storage medium(s) may be utilized. The computer-usable or computer-readable data storage medium may be, for example but not limited to, an electronic, magnetic, optical, or semiconductor system, apparatus, or device. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable data storage medium may be any medium that can store the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
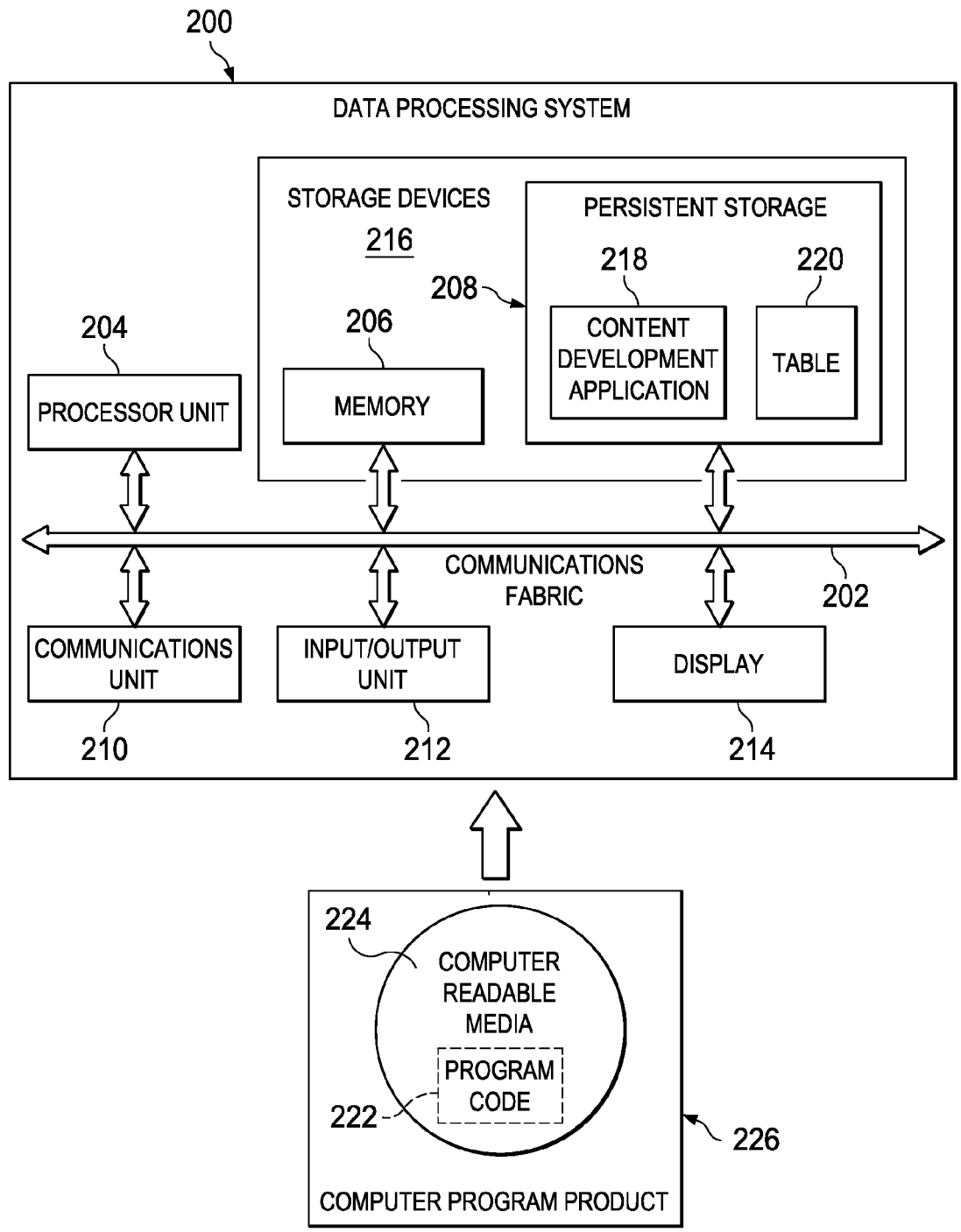
FIG. 2 is a diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102, along with storage unit 108. Storage unit 108 is a network storage device capable of storing data in a structured or unstructured format. Further, storage unit 108 may represent a plurality of storage units connected to network 102.

Storage unit 108 may, for example, store data relating to different communities of practice for a plurality of disciplines and fields of endeavor. In addition, storage unit 108 may store sets of tags, which correspond to each of the different communities of practice stored within the database. A set of tags is a collection of one or more related tags. A tag may, for example, be a keyword or a term associated with a source of data or information, such as a reference book, a Web page, a subject matter expert, or a co-worker. Furthermore, storage unit 108 may store user identification data, user log in data, and user profile data for a plurality of users. Moreover, storage unit 108 may store a plurality of reference materials for use by the plurality of users.

Clients 110, 112, and 114 also connect to network 102. Clients 110, 112, and 114 may, for example, be personal computers or network computers. In the depicted example, server 104 provides information, such as boot files, operating system images, and applications to clients 110, 112, and 114. Clients 110, 112, and 114 are clients to server 104 and/or server 106 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation.

Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may, for example, be a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Persistent storage 208 includes content development application 218 and table 220. Content development application 218 is a computer program that automatically provides an increased quality of information content to users in specific roles within the context of performing particular tasks over time. In other words, content development application 218 is an intelligent role-based situation aware information development program that learns over time from the users' selections of content provided from a plurality of information sources to the users in a specific role within the context of a particular task and other user input data, such as content ratings regarding the quality, usefulness, and accuracy of the content provided to the users.

Content is any information or data that helps or assists a user to perform a specific task or activity. For example, a map is the content, which helps a driver to perform the specific task of driving from point A to point B. The context is defined by what specific task or activity the user is performing. For example, driving the car is the context for a driver user. Similarly, drafting a patent application is the context for a patent agent user.

Quality is the accuracy and/or usefulness of the information or data provided to the user by content development application 218. For example, a driver user is driving the car, which is the context of the activity or task. A map, which is the information content helpful to the driver in performing this specific task, is provided to the driver user. The quality of the information content provided to the driver user is significantly improved only when accurate and useful information is provided to the driver user, such as a detailed map of the area is which the user is driving.

Communities of practice are people bound together by their common responsibility or desire to get a particular type of task or activity accomplished. A role is the job position, responsibility, or duty of the user, such as, for example, a software developer, a patent agent, or a motorist, while performing the particular task or activity. A user in a role is the specific instance of the role, such as, for example, Mike is in the role of a software developer when performing the task of developing a software program.

Take, for example, a patent agent wanting to perform the particular task of drafting a chemical patent application. This patent agent belongs to a number of communities of practice, such as a patent agent CoP, a law firm CoP where the patent agent works, an intellectual property association CoP that the patent agent belongs to, a chemical society CoP that the patent agent also belongs to, and a United States Patent and Trademark Office (USPTO) CoP where the patent agent is registered, which means that the patent agent has multiple discrete roles, as most of us do. Each one of these different communities of practice has its own set of consistent tags associated with information, such as, bookmarks, pod casts, movies, online libraries, subject matter experts, which is relevant to each respective CoP.

In addition, the patent agent may also have previously created a personal set of tags to mark information that the patent agent created or found to be useful from previous searches. Combining the sets of tags from each of the communities of practice associated with the patent agent provides an aggregated set of tags for the patent agent in this role. Then, adding the personal set of tags for the patent agent to the aggregated set of tags from the communities of practice associated with the patent agent results in a new set of tags that represents a useful collection of information available to the patent agent user in this role within the context of performing this particular task of drafting a chemical patent application.

As the patent agent drafts the chemical patent application, the patent agent will be in the context or activity of drafting a set of claims for the chemical invention. In this context of drafting claims, the patent agent will need relevant information, such as, for example, similar chemical patents, related chemical literature, chemical subject matter experts, and appropriate software tools, such as a word processor application with the proper boiler plates and chemical formula drawing tools.

Using the combined set of personal and aggregated CoP tags, which was dynamically created for this patent agent user in this role, content development application 218 filters this combined set of tags based on the current context or activity of the patent agent to accurately map this patent agent (i.e., user in a role) in this particular context (i.e., drafting a set of chemical claims using a word processor) to the relevant information content that the patent agent will need to perform the task accurately. In this example context, relevant information may be documents on patenting guidelines from the USPTO, such as the Manual of Patent Examining Procedure (MPEP), a proper chemical application boiler plate to use, relevant book marks, internet chat status of chemical patent experts, and other related assets.

Content development application 218 monitors and records the content selections made by the patent agent user in the role in the context of this particular task. Content development application 218 may then use this recorded information to increase the quality of the information content provided to the same user in this role within this context in future iterations of this particular task or activity. Also, content development application 218 may use this recorded information to further improve the quality of recommended information assets to a similar role based individual in this particular context. Thus, by capturing and recording user selections of information content provided to users in performance of their tasks, content development application 218 is enabled to provide increased quality of content recommendations to the users over time.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer-usable program code, or computer-readable program code that may be read and executed by a processor in processor unit 204. The program code in the different embodiments may be embodied on different physical or tangible computer readable media, such as memory 206 or persistent storage 208.

Program code 222 is located in a functional form on computer readable media 224 that is selectively removable and may be loaded onto or transferred to data processing system 200 for execution by processor unit 204. Program code 222 and computer readable media 224 form computer program product 226 in these examples. In one example, computer readable media 224 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 224 also may take the form of a persistent storage, such as a hard drive, a thumb drive, or a flash memory that is connected to data processing system 200. The tangible form of computer readable media 224 is also referred to as computer recordable storage media. In some instances, computer readable media 224 may not be removable.

Alternatively, program code 222 may be transferred to data processing system 200 from computer readable media 224 through a communications link to communications unit 210 and/or through a connection to input/output unit 212. The communications link and/or the connection may be physical or wireless in the illustrative examples.

In some illustrative embodiments, program code 222 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 222 may be a server computer, a client computer, or some other device capable of storing and transmitting program code 222.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 224 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may, for example, be memory 206 or a cache such as found in an interface and memory controller hub that may be present in communications fabric 202.

Illustrative embodiments provide a computer implemented method, apparatus, and computer usable program code for automatically increasing the quality of content provided to a user in a role within the context of performing a particular task over time. One piece of dynamic content that illustrative embodiments may provide to a user may, for example, be names of and links and pointers to subject matter experts in the same field of endeavor or CoP. In addition, illustrative embodiments may also recommend to the user within the context of performing a particular task useful tooling, such as a word processor and an appropriate drawing tool, related reference materials, such as patents, books, manuals, and teaching videos, instant messaging status of subject matter experts in the CoP, links and pointers to outside legal council, and links and pointers to relevant case law and federal rules. As the user makes content selections within these different information sources, illustrative embodiments record these particular choices within a data structure for future reference.

As this recorded content selection information is aggregated over time for a plurality of users in a role within the context of performing a particular task, illustrative embodiments may then provide weighted recommendations, which would indicate the most relevant content for the user in this particular context. This weighting may be based on a personal user weight that is biased toward previous content selections made by the particular user. Also, this weighting may be an aggregate weight based on all of the other users' content selections in the same role within the same context.

Consider that a user in a role needs access to reference materials to perform a particular task, such as drafting claims for a chemical application. In this context of drafting claims, illustrative embodiments will provide a defined number of tag aware information sources, such as, for example, five information sources, to the user to perform this particular task. The user then selects, for example, certain information sources, such as an MPEP PDF document and another document, from the defined number of tag aware information sources. Illustrative embodiments record these content selections for this particular user and then may more prominently weight these content selections for the user the next time the user is in this particular context.

An aggregated set of CoP tags associated with a particular user may, for example, be role tags, such as CoP1 set of tags (tag1 and tag2)+CoP2 set of tags (tag3)+....A set of personal tags associated with the particular user may, for example, be (tag4 and tag5). The combination of the aggregated set of CoP tags and the set of personal tags associated with the particular user may, for example, be (tag1, tag2, tag3, tag4, and tag5). A context specific set of tags for this particular user in a role may, for example, be (tag1, tag2, and tag5). In other words, selections of particular content, such as the content associated with tag1, tag2, and tag5, within the context of performing the particular task decreases the total number of tags within the set.

Illustrative embodiments may then use this final set of context specific tags for this particular user to suggest relevant information content to the user in performing this particular task in the future. After the user makes these content selections within the recommended information sources, such as open a document, chat with a subject matter expert via instant messaging, or call a recommended telephone number, while performing the particular task, illustrative embodiments record these content selections for this particular user in a role in a data structure, such as a table, in a storage device.

With reference now to FIG. 3, an exemplary illustration of a table of user records is depicted in accordance with an illustrative embodiment. User table 300 may, for example, be table 220 in FIG. 2. In addition, user table 300 may represent a plurality of tables stored locally and/or remotely in a storage device, such as storage 108 in FIG. 1.

User table 300 is a table of user records for a plurality of users. This plurality of users may, for example, be members of the same CoP or field of endeavor. User table 300 includes user identification (ID) 302, Context ID 304, tags 306, resource 1 308, resource 2 310, and resource N 312. However, it should be noted that user table 300 is only intended as an illustrative example and not meant as a limitation for illustrative embodiments. In other words, user table 300 may include more or less information depending on processes of different illustrative embodiments.

For example, user table 300 may also include data regarding user ratings of content provided to the user. The rating may include information regarding the quality, such as the accuracy and/or usefulness, of the content provided to the user by illustrative embodiments. Further, user table 300 may include data regarding weighting of the content provided to the user based on the user rating of the content. In addition, illustrative embodiments may provide a higher weighting to content selections made by acknowledged subject matter experts within the same CoP to increase the quality of content weighted lists provided to the user. Furthermore, user table 300 may include data that specifies which subject matter experts ratings are to be taken into account when weighting the content provided to the user.

User ID 302 lists a unique identification number for each user listed in user table 300. The user may, for example, use this unique identification number to login to start a particular task. Also, this unique identification number may, for example, be used for security purposes to provide a security mechanism to ensure protection of personal data entered by the user, such as ranking and weighting of content provided to the user, while performing a particular task. Further, user ID 302 is not restricted to a unique identification number, but may also be any type of personal identification data, such as, for example, radio frequency identification (RFID) data, barcode data, or biometric data, which may be used to uniquely identify a user.

Context ID 304 lists a unique context identification for the particular task or activity the user is performing. For example, the user may be performing the specific task of driving a car. As a result, context ID 304 lists the unique context identification for driving a car.

Tags 306 list one or more sets of tags. These sets of tags may, for example, include a personal set of tags associated with the user identified by user ID 302 in a particular task and a sub-set of tags representing the user in a role within the context of performing the particular task. Of course, tags 306 may include other sets of tags, such as, for example, sets of tags associated with communities of practice that the user belongs to. Tags 306 reference a defined number of tag aware information sources.

Resource 1 308, resource 2 310, and resource N 312 represent a plurality of different content sources. In this illustrative example, resource 1 308 represents a reference material resource, resource 2 310 represents a domain or subject matter expert resource, and resource N 312 represents any type of relevant resource that may be provided to a user in a role within the context of performing a particular task. Illustrative embodiments may use all of this information and data recorded in user table 300 to provide higher quality information content recommendations to a user in a specific role within the context of performing a particular task.

Figure 4A:
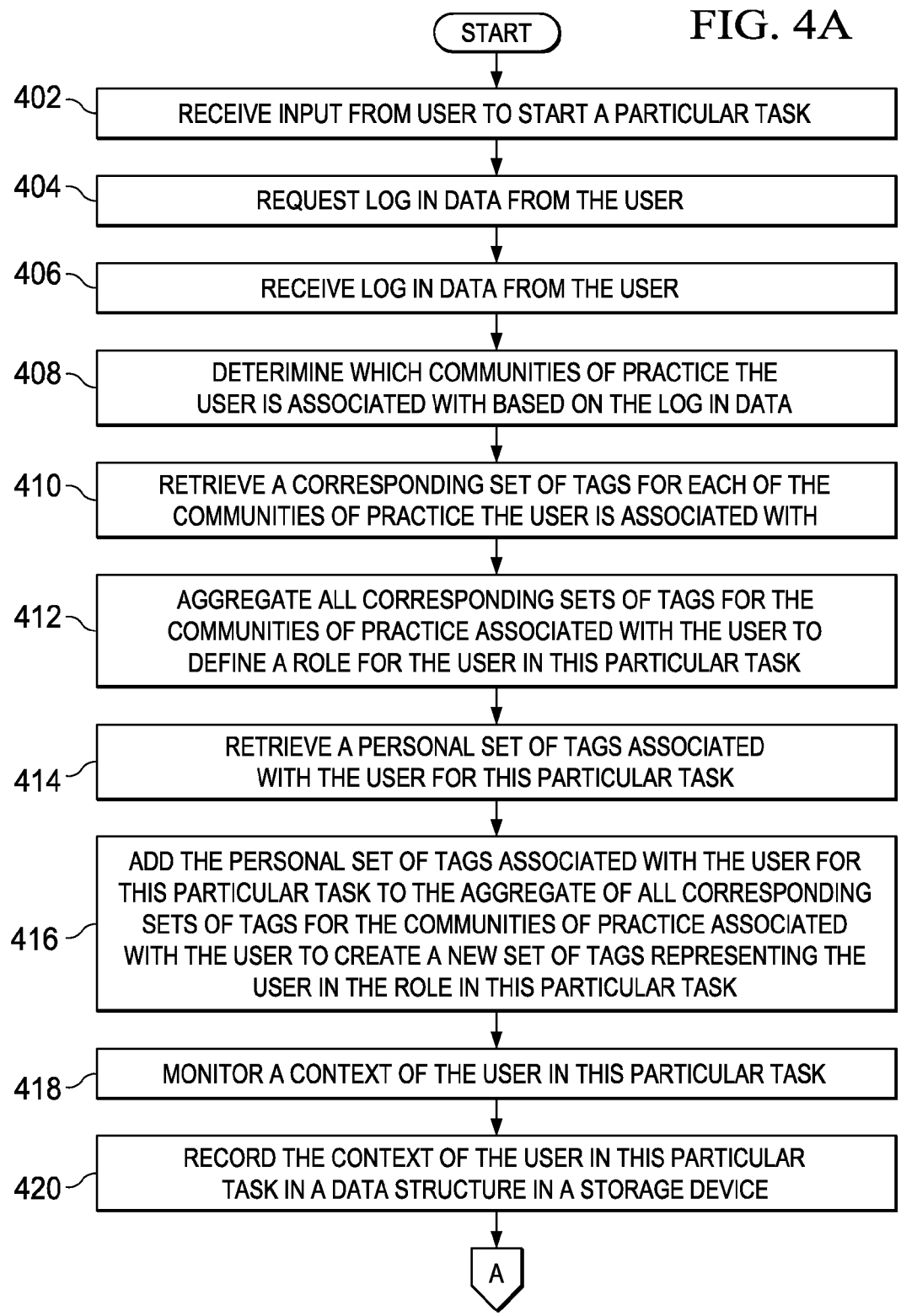
FIG. 4B is a flowchart illustrating an exemplary process for automatically increasing the quality of content provided to a user over time in accordance with an illustrative embodiment.
Figure 4B:
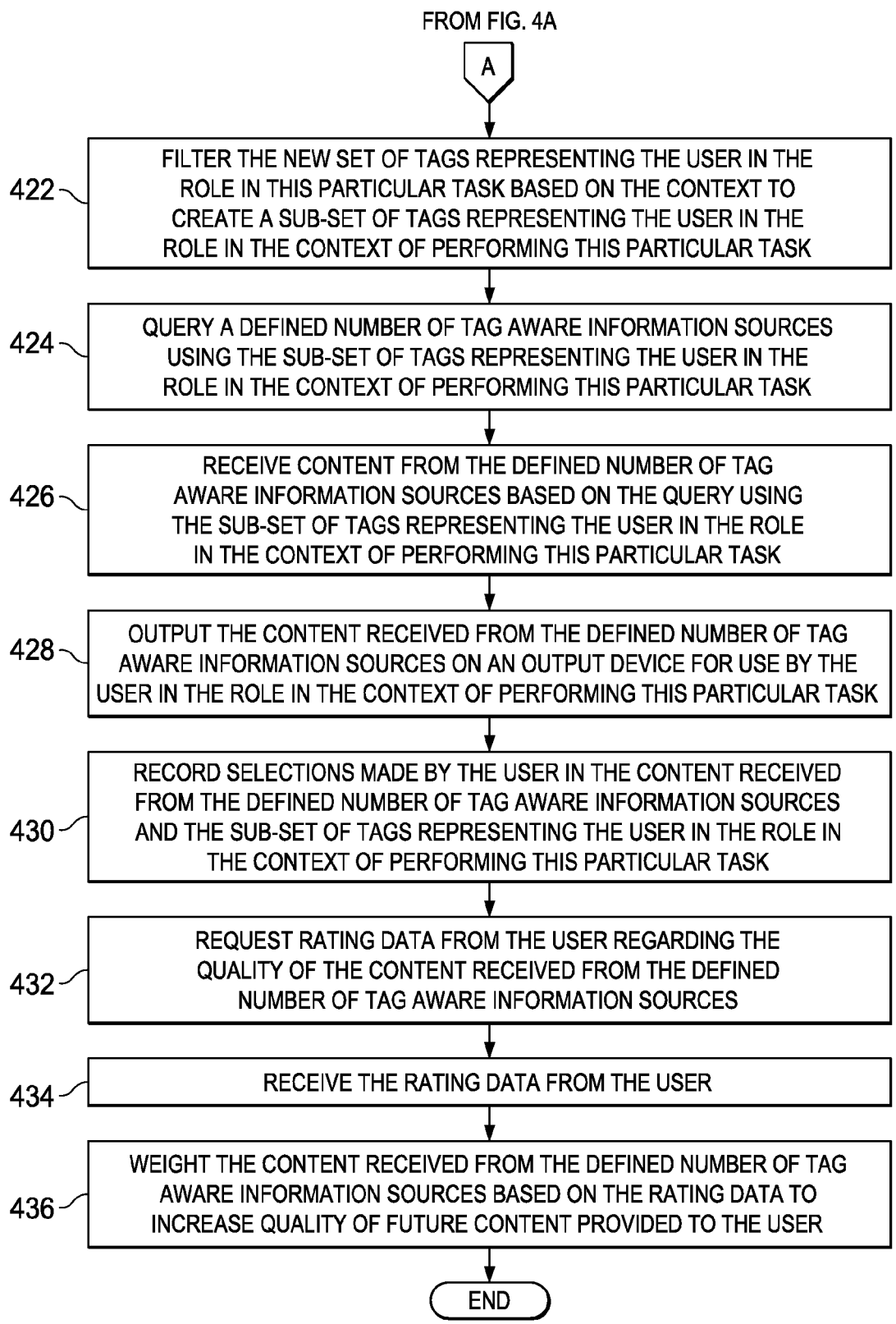

With reference now to FIG. 4A and FIG. 4B, a flowchart illustrating an exemplary process for automatically increasing the quality of content provided to a user over time is shown in accordance with an illustrative embodiment. The process shown in FIGS. 4A and 4B may be implemented in a content development application, such as content development application 218 in FIG. 2.

The process begins when the content development application receives an input from a user to start a particular task (step 402). The content development application then requests login data from the user (step 404). After receiving the user login data (step 406), the content development application determines which communities of practice the user is associated with based on the login data (step 408).

Subsequently, the content development application retrieves a corresponding set of tags for each of the communities of practice the user is associated with (step 410). After retrieving the corresponding sets of tags for the communities of practice associated with the user in step 410, the content development application aggregates all the corresponding sets of tags to define a role for the user in this particular task (step 412). In addition, the content development application also retrieves a personal set of tags associated with the user for this particular task (step 414).

Afterward, the content development application adds the personal set of tags associated with the user for this particular task to the aggregate of all the corresponding sets of tags for the communities of practice associated with the user to create a new set of tags representing the user in the role in this particular task (step 416). Then, the content development application monitors a context, or the activities, of the user in this particular task (step 418) and records the context in a data structure in a storage device, such as table 220 in persistent storage 208 in FIG. 2 (step 420). Subsequently, the content development application filters the new set of tags representing the user in the role in this particular task based on the context to create a sub-set of tags representing the user in the role in the context of performing this particular task (step 422).

After filtering the new set of tags to create the sub-set of tags representing the user in the role in the context of performing this particular task in step 422, the content development application queries a defined number of tag aware information sources using the sub-set of tags (step 424). Then, the content development application receives content from the defined number of tag aware information sources based on the query using the sub-set of tags representing the user in the role in the context of performing this particular task (step 426). Subsequently, the content development application outputs the content received from the defined number of tag aware information sources on an output device, such as display 214 in FIG. 2, for use by the user in the role in the context of performing this particular task (step 428).

Afterward, the content development application records selections made by the user within the content received from the defined number of tag aware information sources and the sub-set of tags representing the user in the role in the context of performing this particular task (step 430). Subsequently, the content development application requests rating data from the user regarding the quality, such as the accuracy and usefulness, of the content received from the defined number of tag aware information sources (step 432). After receiving the rating data from the user (step 434), the content development application weights the content received from the defined number of tag aware information sources based on the rating data to increase the quality of future content provided to the user by the content development application (step 436). The process terminates thereafter.

Thus, illustrative embodiments of the present invention provide a computer implemented method, apparatus, and computer program product for automatically increasing the quality of content provided to a user in a role within the context of performing a particular task over time. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the illustrative embodiments can take the form of a computer program product accessible from a computer-usable or computer-readable data storage medium providing program code for use by or in connection with a computer or any instruction execution system. For the purposes of this description, a computer-usable or computer-readable data storage medium can be any tangible apparatus that can store the program for use by or in connection with the instruction execution system, apparatus, or device.

The computer-readable data storage medium can be an electronic, magnetic, optical, or semiconductor system (or apparatus or device) Examples of a computer-readable data storage medium include a semiconductor or solid state memory, magnetic tape, a removable computer diskette, a random access memory (RAM), a read-only memory (ROM), a rigid magnetic disk and an optical disk. Current examples of optical disks include compact disk —read only memory (CD-ROM), compact disk —read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for automatically increasing a quality of content provided to a user, the method comprising the steps of:
determining, by a computer, communities of practice a user is associated with based on login data received from the user to start a particular task, wherein the login data is biometric data that identifies the user;
retrieving, by the computer, a corresponding set of tags for each of the communities of practice determined to be associated with the user based on the login data received;

aggregating, by the computer, all corresponding sets of tags for the communities of practice determined to be associated with the user to define a role for the user in the particular task;

retrieving, by the computer, a personal set of tags associated with the user for the particular task;

adding, by the computer, the personal set of tags associated with the user for the particular task to the aggregate of all corresponding sets of tags for the communities of practice determined to be associated with the user to create a new set of tags representing the user in the role in the particular task;

recording, by the computer, a context of performing the particular task by the user in a data structure in a storage device;

filtering, by the computer, the new set of tags representing the user in the role in the particular task based on the context to create a sub-set of tags representing the user in the role in the context of performing the particular task;

querying, by the computer, a defined number of tag aware information sources using the sub-set of tags representing the user in the role in the context of performing the particular task;

receiving, by the computer, content from the defined number of tag aware information sources based on the query using the sub-set of tags representing the user in the role in the context of performing the particular task;

outputting, by the computer, the content received from the defined number of tag aware information sources on an output device for use by the user in the role in the context of performing the particular task; and weighting, by the computer, the content received from the defined number of tag aware information sources based on an aggregate weight of previous selections of the content by other users in a same role as the user within a same context of performing the particular task, wherein the computer outputs the content received from the defined number of tag aware information sources based on the weighting of the content.

2. The method of claim 1, further comprising the step of: monitoring, by the computer, the context of the user in the particular task.

3. The method of claim 1, further comprising the steps of:
recording, by the computer, selections made by the user in the content received from the defined number of tag aware information sources; and
recording, by the computer, the sub-set of tags representing the user in the role in the context of performing the particular task.

4. The method of claim 1, further comprising the step of: receiving, by the computer, rating data from the user regarding a quality of the content received from the defined number of tag aware information sources.

5. The method of claim 1, further comprising the step of increasing, by the computer, a weight of the content based on previous selections of the content by subject matter experts within a same community of practice as the user, the previous selections made while the subject matter experts were performing the particular task.

6. The method of claim 5, wherein the user specifies which of the subject matter experts are to be taken into account for the weighting.

7. The method of claim 1, wherein the content is data that assists the user in performing the particular task, and wherein the context is defined by a specific activity the user is performing, and wherein the role is a job responsibility of the user to get the particular task accomplished, and wherein a community of practice in the communities of practice is a group of people bound together by their common responsibility to get the particular task accomplished.

8. The method of claim 1, wherein the quality is an accuracy and usefulness of the content output to the user.

9. The method of claim 1, wherein a set of tags is a collection of one or more related tags, and wherein a tag in the set of tags is a keyword associated with a tag aware information source.

10. A computer system for automatically increasing a quality of content provided to a user, the computer system comprising:

one or more processors, one or more computer-readable memories, and one or more computer-readable tangible storage devices;

program instructions, stored on at least one of the one or more computer-readable tangible storage devices for execution by at least one of the one or more processors via at least one of the one or more computer-readable memories, to determine communities of practice a user is associated with based on login data received from the user to start a particular task, wherein the login data is biometric data that identifies the user;

program instructions, stored on at least one of the one or more computer-readable tangible storage devices for execution by at least one of the one or more processors via at least one of the one or more computer-readable memories, to retrieve a corresponding set of tags for each of the communities of practice determined to be associated with the user based on the login data received;

program instructions, stored on at least one of the one or more computer-readable tangible storage devices for execution by at least one of the one or more processors via at least one of the one or more computer-readable memories, to aggregate all corresponding sets of tags for the communities of practice determined to be associated with the user to define a role for the user in the particular task;

program instructions, stored on at least one of the one or more computer-readable tangible storage devices for execution by at least one of the one or more processors via at least one of the one or more computer-readable memories, to retrieve a personal set of tags associated with the user for the particular task;

program instructions, stored on at least one of the one or more computer-readable tangible storage devices for execution by at least one of the one or more processors via at least one of the one or more computer-readable memories, to add the personal set of tags associated with the user for the particular task to the aggregate of all corresponding sets of tags for the communities of practice determined to be associated with the user to create a new set of tags representing the user in the role in the particular task;

program instructions, stored on at least one of the one or more computer-readable tangible storage devices for execution by at least one of the one or more processors via at least one of the one or more computer-readable memories, to record a context of performing the particular task by the user in a data structure in the storage device;

program instructions, stored on at least one of the one or more computer-readable tangible storage devices for execution by at least one of the one or more processors via at least one of the one or more computer-readable memories, to filter the new set of tags representing the user in the role in the particular task based on the context to create a sub-set of tags representing the user in the role in the context of performing the particular task;

program instructions, stored on at least one of the one or more computer-readable tangible storage devices for execution by at least one of the one or more processors via at least one of the one or more computer-readable memories, to query a defined number of tag aware information sources using the sub-set of tags representing the user in the role in the context of performing the particular task;

program instructions, stored on at least one of the one or more computer-readable tangible storage devices for execution by at least one of the one or more processors via at least one of the one or more computer-readable memories, to receive content from the defined number of tag aware information sources based on the query using the sub-set of tags representing the user in the role in the context of performing the particular task; program instructions, stored on at least one of the one or more computer-readable tangible storage devices for execution by at least one of the one or more processors via at least one of the one or more computer-readable memories, to output the content received from the defined number of tag aware information sources on an output device for use by the user in the role in the context of performing the particular task; and program instructions, stored on at least one of the one or more computer-readable tangible storage devices for execution by at least one of the one or more processors via at least one of the one or more computer-readable memories, to weight the content received from the defined number of tag aware information sources based on an aggregate weight of previous selections of the content by other users in a same role as the user within a same context of performing the particular task, wherein the output of the content received from the defined number of tag aware information sources is based on the weight of the content.

11. A computer program product for automatically increasing a quality of content provided to a user, the computer program product comprising:

one or more computer-readable tangible storage devices;

program instructions, stored on at least one of the one or more computer-readable tangible storage devices, to determine communities of practice a user is associated with based on login data received from the user to start a particular task, wherein the login data is biometric data that identifies the user;

program instructions, stored on at least one of the one or more computer-readable tangible storage devices, to retrieve a corresponding set of tags for each of the communities of practice determined to be associated with the user based on the login data received;

program instructions, stored on at least one of the one or more computer-readable tangible storage devices, to aggregate all corresponding sets of tags for the communities of practice determined to be associated with the user to define a role for the user in the particular task;

program instructions, stored on at least one of the one or more computer-readable tangible storage devices, to retrieve a personal set of tags associated with the user for the particular task;

program instructions, stored on at least one of the one or more computer-readable tangible storage devices, to add the personal set of tags associated with the user for the particular task to the aggregate of all corresponding sets of tags for the communities of practice determined to be associated with the user to create a new set of tags representing the user in the role in the particular task;

program instructions, stored on at least one of the one or more computer-readable tangible storage devices, to record a context of performing the particular task by the user in a data structure in a storage device;

program instructions, stored on at least one of the one or more computer-readable tangible storage devices, to filter the new set of tags representing the user in the role in the particular task based on the context to create a sub-set of tags representing the user in the role in the context of performing the particular task;

program instructions, stored on at least one of the one or more computer-readable tangible storage devices, to query a defined number of tag aware information sources using the sub-set of tags representing the user in the role in the context of performing the particular task;

program instructions, stored on at least one of the one or more computer-readable tangible storage devices, to receive content from the defined number of tag aware information sources based on the query using the sub-set of tags representing the user in the role in the context of performing the particular task;

program instructions, stored on at least one of the one or more computer-readable tangible storage devices, to output the content received from the defined number of tag aware information sources on an output device for use by the user in the role in the context of performing the particular task; and program instructions, stored on at least one of the one or more computer-readable tangible storage devices, to weight the content received from the defined number of tag aware information sources based on an aggregate weight of previous selections of the content by other users in a same role as the user within a same context of performing the particular task, wherein the output of the content received from the defined number of tag aware information sources is based on the weight of the content.

12. The computer program product of claim 11, further comprising:

program instructions, stored on at least one of the one or more computer-readable tangible storage devices, to monitor the context of the user in the particular task.

13. The computer program product of claim 11, further comprising:

program instructions, stored on at least one of the one or more computer-readable tangible storage devices, to record selections made by the user in the content received from the defined number of tag aware information sources; and program instructions, stored on at least one of the one or more computer-readable tangible storage devices, to record the sub-set of tags representing the user in the role in the context of performing the particular task.

14. The computer program product of claim 11, further comprising:

program instructions, stored on at least one of the one or more computer-readable tangible storage devices, to receive rating data from the user regarding a quality of the content received from the defined number of tag aware information sources.

15. The computer program product of claim 11, further comprising:

program instructions, stored on at least one of the one or more computer-readable tangible storage devices, to increase a weight of the content based on previous selections of the content by subject matter experts within a same community of practice as the user, the previous selections made while the subject matter experts were performing the particular task.

* * * * *